(12) United States Patent
Nohira (10) Patent No.: US 7,311,365 B2
(45) Date of Patent: Dec. 25, 2007

(54) ACTUATOR FOR CONTROLLING BRAKE HYDRAULIC PRESSURE AND DEVICE AND METHOD FOR INSPECTING THE SAME

(75) Inventor: Shigemitsu Nohira, Toyota (JP)

(73) Assignee: Advics Co., Ltd., Kariya, Aichi (JP)

( * ) Notice: Subject to any disclaimer, the term of this patent is extended or adjusted under 35 U.S.C. 154(b) by 0 days.

(21) Appl. No.: 10/946,526

(22) Filed: Sep. 22, 2004

(65) Prior Publication Data
US 2005/0067894 A1 Mar. 31, 2005

(30) Foreign Application Priority Data
Sep. 26, 2003 (JP) ............... 2003-335662
Jun. 9, 2004 (JP) ............... 2004-171643

(51) Int. Cl.
*B60T 8/36* (2006.01)
(52) U.S. Cl. ...................... 303/119.1; 303/DIG. 10
(58) Field of Classification Search ............ 303/113.1, 303/DIG. 10
See application file for complete search history.

(56) References Cited

U.S. PATENT DOCUMENTS

| | | | | |
|---|---|---|---|---|
| 4,705,324 A | * | 11/1987 | Kervagoret | 303/119.3 |
| 4,796,958 A | * | 1/1989 | Brown, Jr. | 303/113.1 |
| 5,069,508 A | * | 12/1991 | Maehara | 303/113.2 |
| 5,071,201 A | * | 12/1991 | Maehara | 303/113.2 |
| 5,072,996 A | * | 12/1991 | Heibel et al. | 303/114.3 |
| 5,593,216 A | * | 1/1997 | Hosoya et al. | 303/119.2 |
| 5,607,207 A | * | 3/1997 | Nagashima et al. | 303/113.1 |
| 5,988,767 A | * | 11/1999 | Inoue et al. | 303/113.1 |
| 6,260,933 B1 | * | 7/2001 | Dinkel et al. | 303/113.1 |
| 6,443,537 B2 | | 9/2002 | Koyama | |

FOREIGN PATENT DOCUMENTS

| | | |
|---|---|---|
| DE | 44 06 269 A1 | 9/1994 |
| JP | 08-011696 | 1/1996 |
| JP | 2001-260846 | 9/2001 |

OTHER PUBLICATIONS

German Office Action, with English-language Translation, dated May 15, 2006.

* cited by examiner

*Primary Examiner*—Melanie Torres
(74) *Attorney, Agent, or Firm*—Buchanan Ingersoll & Rooney PC (57) ABSTRACT

An actuator for use in a vehicle hydraulic brake system having an anti-lock control and/or vehicle stability control function has a housing which also serves as the body of the master cylinder. The housing is formed with four wheel cylinder ports to be connected to the respective wheel cylinders through pipes. Since there is usually enough space in front of the housing, all of the wheel cylinder ports are formed in the front end face of the housing so that the pipes can be arranged in the large space in front of the actuator. The ports are arranged in the width direction of the vehicle with the ports at both ends located at a higher level than the other ports. With this arrangement, pipes can be easily mounted to and dismounted from the ports at both ends by turning a spanner without the possibility of the spanner interfering with components in the engine room, such as a relay box or the engine.

7 Claims, 9 Drawing Sheets

PRIOR ART

Fig.9

PRIOR ART

ACTUATOR FOR CONTROLLING BRAKE HYDRAULIC PRESSURE AND DEVICE AND METHOD FOR INSPECTING THE SAME

BACKGROUND OF THE INVENTION

This invention relates to an actuator for controlling brake hydraulic pressure to be mounted in a vehicle hydraulic brake system such as an anti-lock brake system (ABS) or a vehicle stability control (VSC) system, and a device and a method for inspecting such an actuator.

Figure 8:
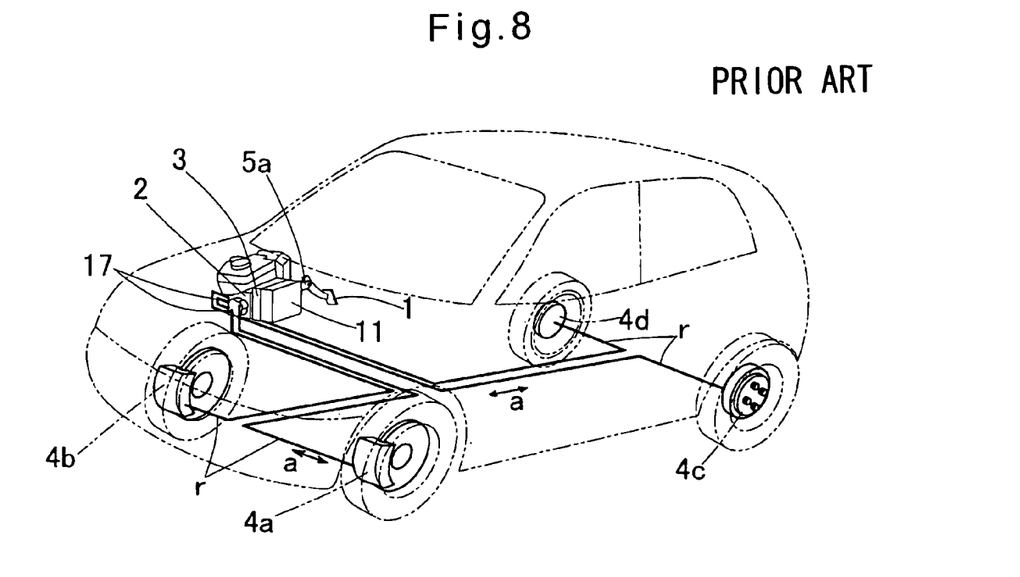
FIG. 8 is a perspective view of a conventional actuator for a vehicle hydraulic brake system, as mounted on a vehicle.

As shown in FIG. 8 and disclosed in unexamined JP patent publication 2001-260846, such a brake system includes an actuator 3 for controlling brake hydraulic pressure provided between a brake pedal 1 and brake wheel cylinders 4a–4d. The actuator 3 comprises control valves for pressure increase and reduction, respectively, that are mounted in a housing. By selectively turning on and off these control valves, hydraulic pressure to be supplied to the brake wheel cylinders 4a–4d can be controlled.

Today, there are a vast variety of such vehicle hydraulic brake systems, including those having anti-lock control and/or vehicle stability control functions. Different brake systems need different kinds of actuators. Today's such actuators comprise a far greater number of component parts than older ones. It is therefore acutely desired that each of the component parts forming the actuator be as small as possible.

Figure 9:
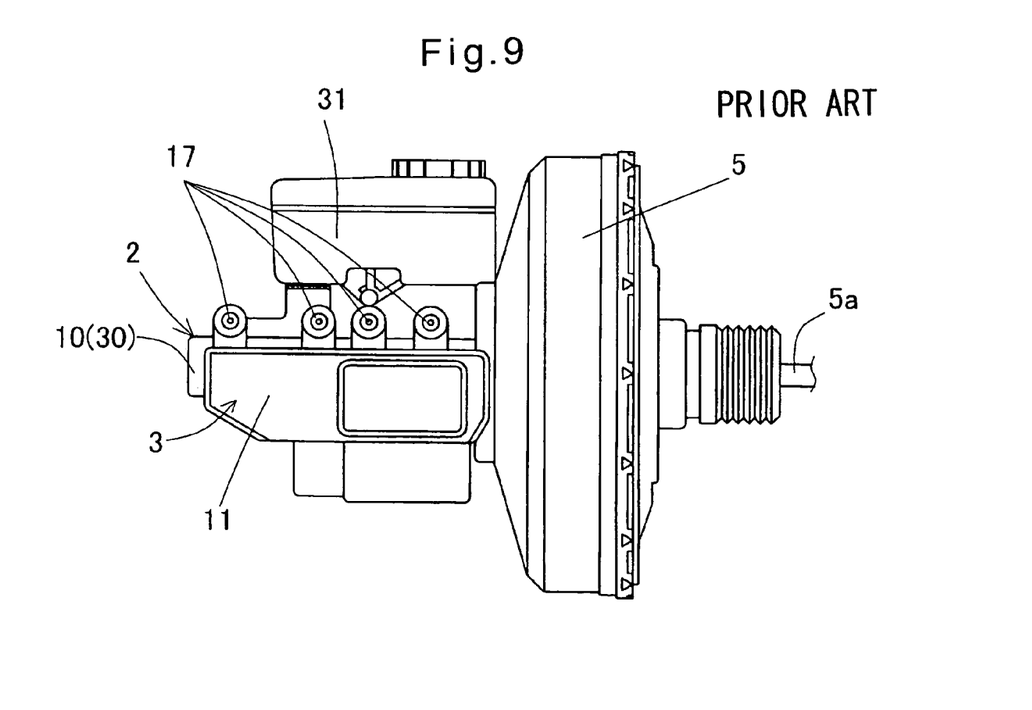
FIG. 9 is a side view of a conventional actuator for use in a vehicle hydraulic system.

FIG. 9 shows a compact brake unit disclosed in unexamined JP patent publication 08-11696 and comprising a hydraulic brake booster 5, an actuator 3 for controlling brake hydraulic pressure mounted to the booster 5, and a master cylinder 2. A brake pedal 1 is coupled to a piston rod 5a of the master cylinder 2. The housing 10 of the actuator 3 is integral with the body 30 of the master cylinder 2. Control valves for pressure increase and pressure reduction and other elements of the actuator 3 are mounted in the housing 10. Pipes r run from the housing 10 to the brake wheel cylinders 4a–4d.

Figure 12:
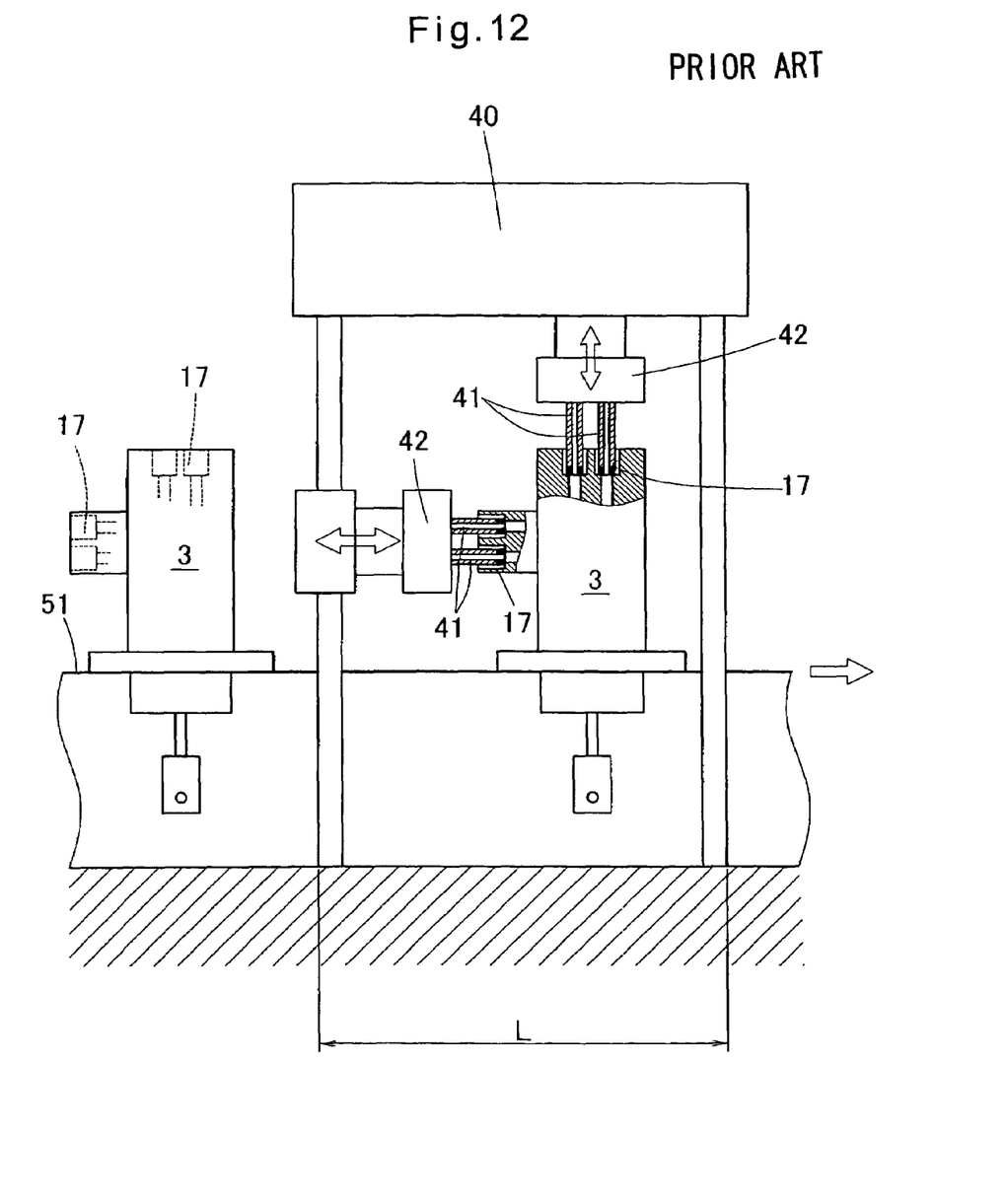
FIGS. 12 and 13 show two different conventional inspection devices for inspecting conventional actuators for their hydraulic performance.
Figure 13:
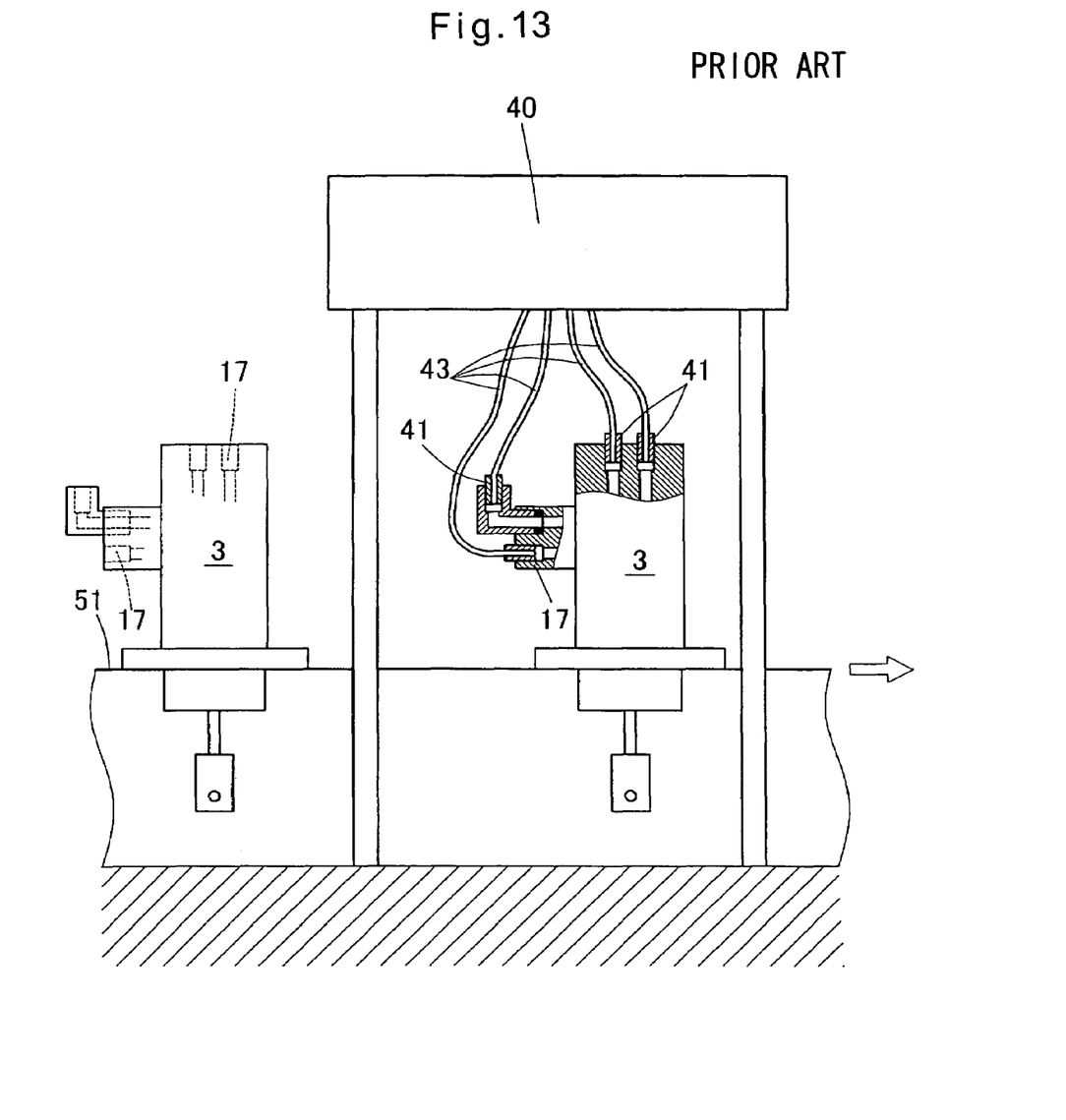

Before shipment to a car manufacturer (to its assembly factory), the actuator 3 is inspected for its hydraulic performance. As shown in FIGS. 12 and 13, the inspection is conducted by sending a plurality of such actuators 3 one by one into an inspection device 40, in which port couplers 41 are connected to respective wheel cylinder ports 17 of each actuator 3, and hydraulic pressure or air pressure is introduced into the actuator 3 through the couplers 41 and the ports 17.

Figure 10A:
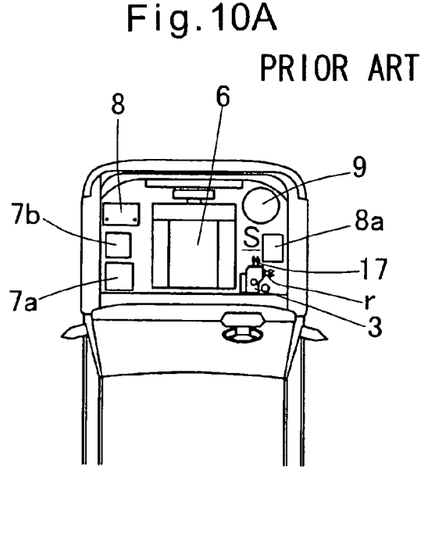
FIGS. 10A and 10B are schematic plan views of the actuator of FIG. 8, as mounted on vehicles of different types.
Figure 10B:
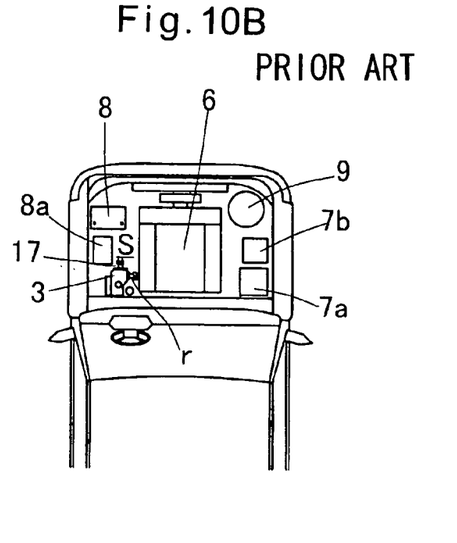

If the actuator 3 is the one used in an ABS, it usually has four wheel cylinder ports 17, of which two are provided in the front end wall of the housing 10 of the actuator (which is also the body of the master cylinder 2) and the other two are provided in the right-hand side wall thereof, as shown in FIGS. 10A and 10B.

Four pipes r extend from the respective ports 17 to the respective wheel cylinders 4a–4d as shown in FIG. 8. In either of a vehicle with the steering wheel (and thus the brake pedal) arranged on the right-hand side of the vehicle (FIG. 10A) and a vehicle with the steering wheel on the left (FIG. 10B), the actuator 3 is mounted in the engine room such that the space between the side wall of the engine room and the actuator 3 is greater than the space between the engine 6 and the actuator 3. Thus, in the case of a vehicle with the steering wheel on the right, there exists a large space between the ports 17 formed in the right-hand side wall of the housing 10 of the actuator 3 and the right-hand side wall of the engine room. Thus, the pipes r can be easily connected to these ports 17. In the case of a vehicle with the steering wheel on the left, however, there exists only a narrow space between the ports 17 formed in the right-hand side wall of the actuator 3 and the engine 6. Thus, it is difficult or sometimes impossible to connect the pipes r to these ports 17.

Figure 11A:
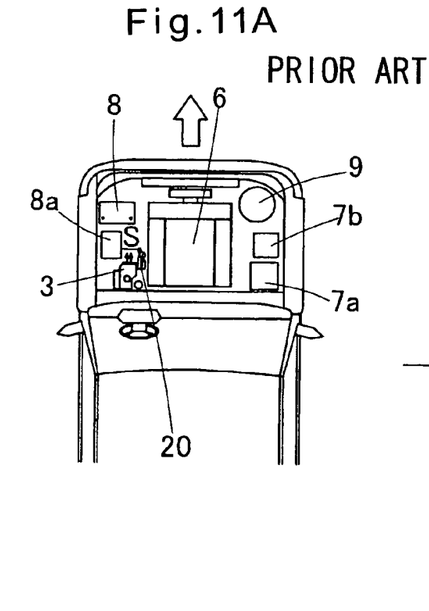
FIG. 11A is a schematic plan view of another conventional actuator, as mounted on a vehicle.
Figure 11B:
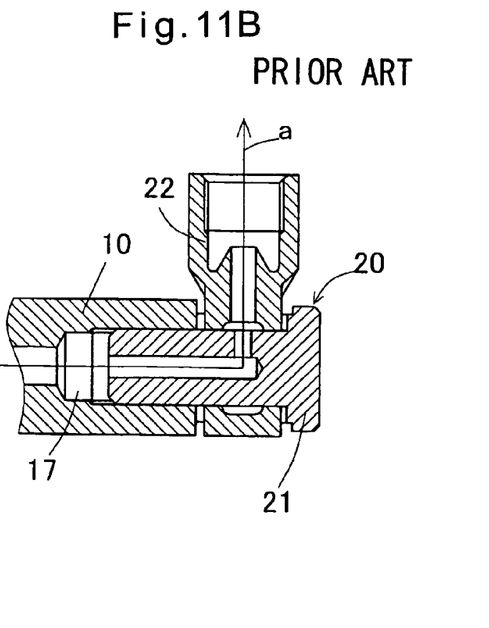
FIG. 11B is a sectional view of a union connector mounted to one of the wheel cylinder ports of the conventional actuator of FIG. 11A.

In order to connect the pipes r to the ports 17 formed in the right-hand side wall of the housing 10 of the actuator 3 mounted in a vehicle with the steering wheel on the left, the pipes r are sometimes connected to these ports 17 through union connectors 20 as shown in FIG. 11A. As shown in FIG. 11B, each union connector 20 comprises a bolt 21 formed with a passage and threadedly engaged in one of the ports 17, and a union member 22 pivotally mounted on the protruding end of the bolt 21 such that the passage formed therein communicates with the passage formed in the bolt 21. A pipe r is connected to the union member 22. Since the union member 22 of each union connector 20 is pivotable relative to the bolt 21, the pipes r connected to the ports 17 on the right-hand side wall of the actuator 3 can be arranged so as to extend forwardly (the direction indicated by the arrow of FIG. 11A) of the vehicle through the narrow space between the actuator 3 and the engine 6. But use of such union connectors 20 is extremely troublesome. Mounted in the engine room besides the engine 6 are an engine cooling fluid tank 7a, a windshield washing water tank 7b, a battery 8, a relay box 8a and an air cleaner 9.

FIG. 9 shows another conventional arrangement in which all four ports 17 are formed along one side wall of the housing 10. If the ports 17 are formed along the right-hand side wall of the housing 10, they will face the engine 6 of a vehicle with the steering wheel on the left, and if the ports 17 are formed along the left-hand side wall of the housing 10, they will face the engine 6 of a vehicle with the steering wheel on the right. Thus, in either case, the same problem mentioned above with reference to FIGS. 10A and 10B will arise.

One way to solve this problem would be to prepare two kinds of actuators, one for a vehicle with the steering wheel on the right, which has all or some of their ports 17 formed in the right-hand side wall of the housing 10, and the other for a vehicle with the steering wheel on the left, which has all or some of their ports 17 formed in the left-hand side wall of the housing. But preparing two different kinds of actuators is troublesome and thus will push up the cost.

In order to dismount the pipes r from the respective ports 17 for repair and subsequently re-mount them to the ports 17, a spanner having a long handle as shown at 50 in FIG. 5 has to be used. When such a spanner is turned in the space between the housing 10 and the side wall of the engine room or the engine 6 to attach and detach pipes r to and from the ports 17 formed in one of the side walls of the housing 10, the spanner tends to interfere with the relay box 8a or the engine 6.

Preferably, an inspection for hydraulic performance of such actuators 3 is conducted automatically for higher productivity. As described above and as shown in FIGS. 12 and 13, this inspection is conducted by sending a plurality of such actuators 3 one by one into the inspection device 40, in which the port couplers 41 are connected to the respective wheel cylinder ports 17 of each actuator 3, and hydraulic pressure or air pressure is introduced into the actuator 3 through the couplers 41 and the ports 17.

The actuators 3 are transported on a conveyor 51. If the actuators inspected are of the type having their wheel cylinder ports 17 formed both in the front wall and one of the side walls thereof, it is necessary to provide the inspection device 40 with two jigs 42 for automatically connecting the port couplers 41 to the respective ports 17. As shown in FIG. 12, the two jigs 42 have to be provided so as to reciprocate in directions perpendicular to each other. Such jigs take up much space and thus increase the size of the inspection device 40, especially its length L.

The wheel cylinder ports 17 of the actuators 3 shown in FIG. 13 have different lengths and are oriented in different directions from each other because one of them carries a union connector 20 as shown in FIG. 11B, while the others do not. Thus, jigs 42 shown in FIG. 12 cannot be used to automatically connect the port couplers 41 to the respective ports 17. The couplers 41 have to be manually connected to the respective ports 17 instead. This is troublesome and inefficient.

An object of the present invention is to provide an actuator for a vehicle hydraulic brake system which can be mounted in either of a vehicle having its steering wheel arranged on its right and a vehicle having its steering wheel arranged on its left such that enough space is provided in the engine room for arranging pipes for connecting its wheel cylinder ports to the respective wheel cylinders and for mounting and dismounting the pipes from the wheel cylinder ports, and a method and a device for inspecting such actuators in a smooth and efficient way.

SUMMARY OF THE INVENTION

According to the present invention, there is provided an actuator for controlling brake hydraulic pressure, the actuator being adapted to be mounted on a vehicle between a brake pedal and brake wheel cylinders for front wheels and rear wheels of the vehicle, and comprising a housing, and pressure increase and pressure reduction control valves mounted in the housing to control hydraulic pressures to be supplied to the respective brake wheel cylinders, the housing having at least three wheel cylinder ports which are all formed in one side of the housing and which are adapted to be connected to the brake wheel cylinders, the actuator being adapted to be mounted on the vehicle with the one side of the housing facing forward of the vehicle.

The length and width of a motor vehicle are restricted by laws and regulations according to the displacement of its engine. Generally speaking, such regulations are tough with respect to the width of the car and lax with respect to its length. Thus, there is usually enough space left in front of the actuator of the brake system as shown by the letter S in FIGS. 10 and 11. By providing the wheel cylinder ports of the actuator in the front end face of its housing, the pipes for connecting the ports to the respective wheel cylinders can be arranged in this large space S.

There are no conventional actuators of this type having more than two wheel cylinder ports formed in the front end face of its housing.

Preferably, the at least three cylinder ports are arranged in the width direction of the vehicle with two of the at least three ports at both ends located at a higher level than the other of the at least three ports.

With this arrangement, it is possible to shorten the horizontal distance between each of the ports at both ends and the adjacent ports, and thus can shorten the distance between the ports at both ends. The ports can thus be arranged in a narrow area, which in turn makes it possible to shorten the width of the housing of the actuator. By providing the ports at both ends at a higher level than the other ports, a tool such as a spanner can be turned to mount and dismount pipes to and from the respective wheel cylinder ports without the possibility of interfering with components in the engine room such as a relay box (see FIG. 5).

From another aspect of the invention, there is provided a method of inspecting a plurality of actuators as described above for their hydraulic performance, the method comprising the steps of providing a single coupler support member on an inspection device so as to be movable toward and away from one of the actuators, providing as many port couplers as the at least three wheel cylinder ports formed in each of the actuators on the single coupler support member, introducing the plurality of actuators one by one into the inspection device, moving the coupler support member toward the actuator in the inspection device until the port couplers are coupled to the respective wheel cylinder ports of the actuator in the inspection device at one time, and supplying hydraulic fluid through the port couplers and the wheel cylinder ports at one time to inspect the actuators.

Also, there is provided an inspection device for inspecting a plurality of the actuators of claim 1 or 2 for their hydraulic performance, the device comprising as many port couplers as the at least three wheel cylinder ports formed in each of the actuators, the port couplers being movable toward one of the actuators that has been introduced into the inspection device until the port couplers are coupled to the respective wheel cylinder ports of the actuators in the inspection device, and movable away from the actuator in the inspection device until the port couplers are uncoupled from the respective wheel cylinder ports, whereby the actuators can be inspected for their hydraulic performance by supplying hydraulic fluid through the port couplers and the wheel cylinder ports at one time.

BRIEF DESCRIPTION OF THE DRAWINGS

Other features and advantages of the present invention will become apparent from the following description made with reference to the accompanying drawings, in which.

DETAILED DESCRIPTION OF THE PREFERRED EMBODIMENT

Figure 1:
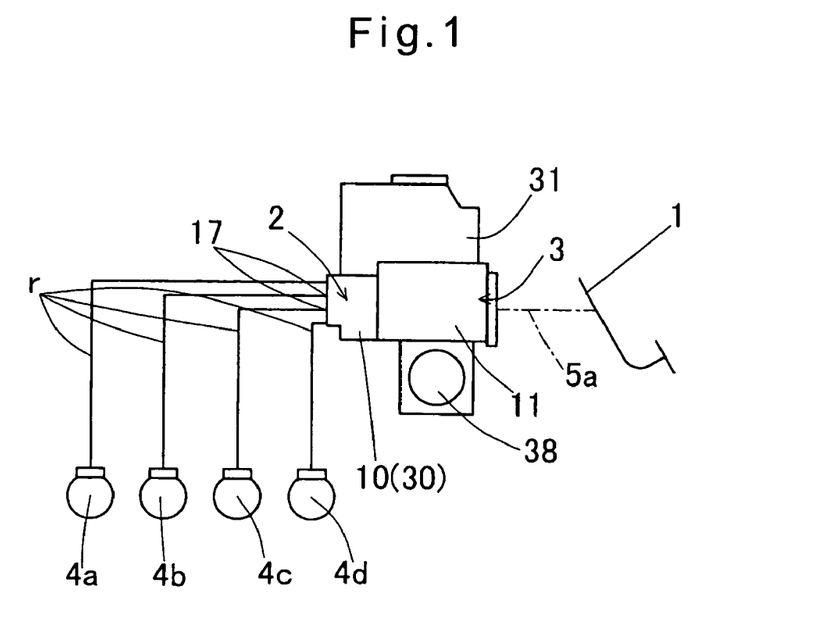
FIG. 1 is a schematic view of the actuator of a first embodiment.

First referring to FIG. 1, the actuator 3 of this embodiment is mounted to a hydraulic brake booster for compactness. A brake pedal 1 is coupled to a piston rod 5a of the master cylinder 2. The actuator 3 has a housing 10 which also serves as a body 30 of the master cylinder 2. Control valves for pressure increase and for pressure reduction are mounted in the housing 10 in substantially the same manner as described in JP patent publication 08-11696.

Figure 2A:
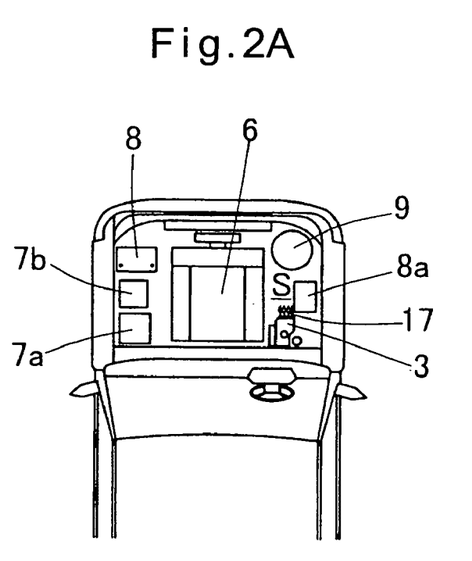
FIGS. 2A and 2B are schematic plan views of the actuator of FIG. 1, as mounted on vehicles of different types.
Figure 2B:
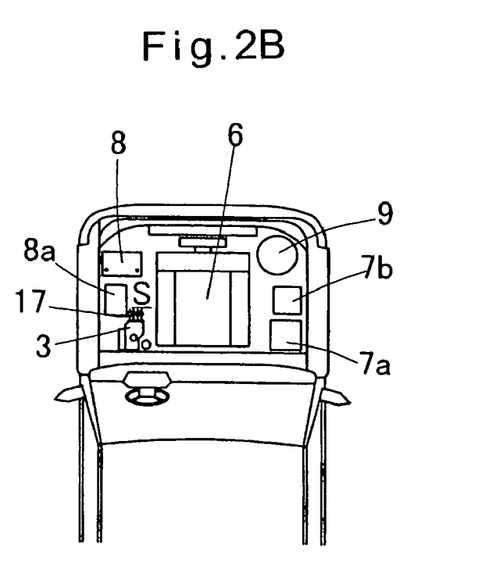

Four wheel cylinder ports 17 are formed in the front end face of the body 30 of the master cylinder 2 (or the housing 10 of the actuator 3). Thus, pipes r can be easily connected to the respective ports 17 so as to extend to brake wheel cylinders 4a–4d, because in either of a vehicle having its steering wheel arranged on its right (FIG. 2A) and a vehicle having its steering wheel arranged on its left (FIG. 2B), a sufficiently large space S exists in the engine room in front of the master cylinder body 30 (the housing 10 of the actuator 3).

The body 30 of the master cylinder body 2 (i.e. the housing 10 of the actuator 3) is formed of an aluminum alloy.

Figure 3:
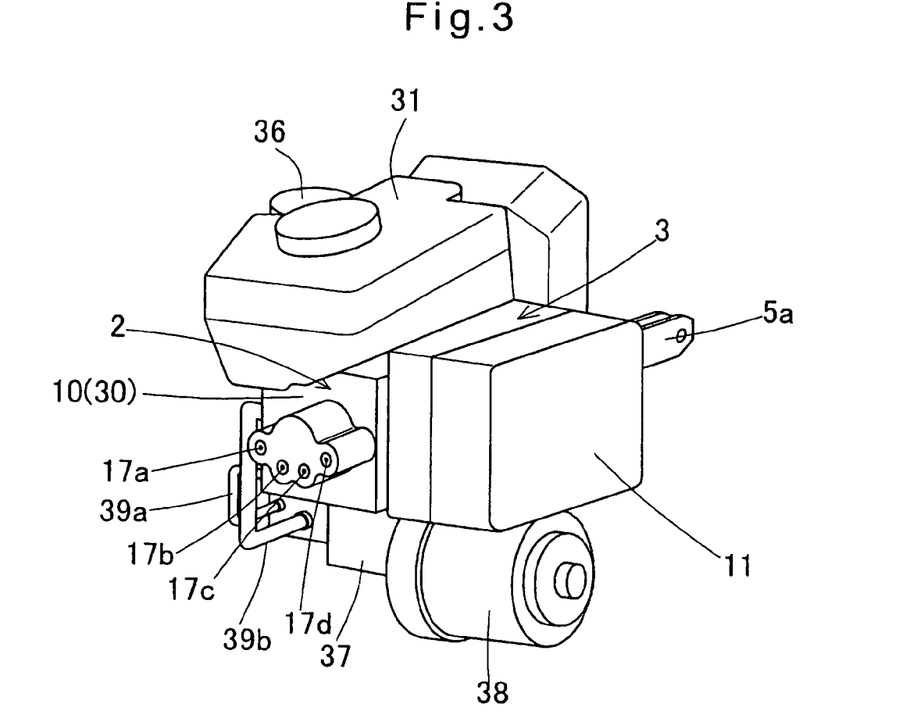
FIG. 3 is a perspective view of a module of a vehicle brake system including the actuator of FIG. 1.
Figure 4:
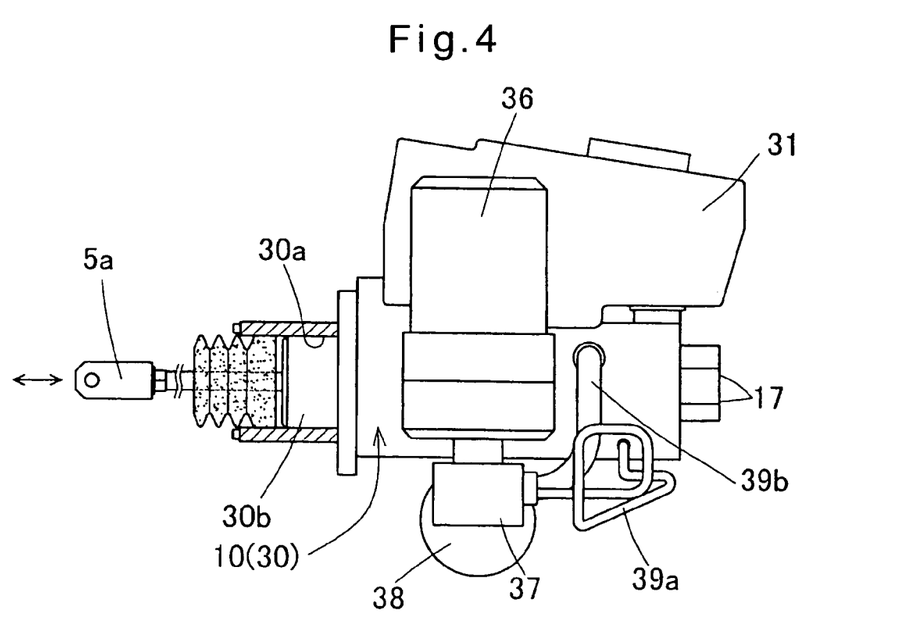
FIG. 4 is a partially cutaway side view of the module of FIG. 3.
Figure 5:
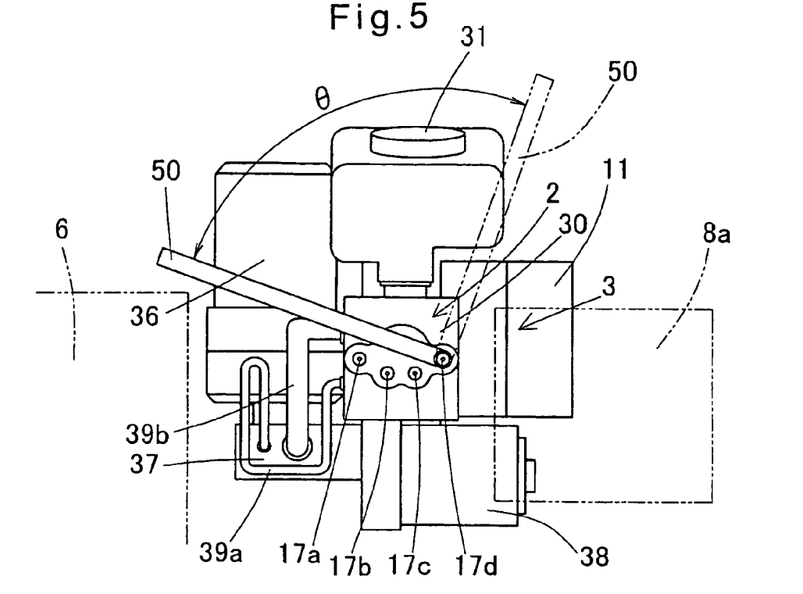
FIG. 5 is a front view of the same.

As shown in FIGS. 3–5, the piston rod 5a is connected to a piston 30b slidably mounted in a cylinder 30a formed in the housing 10. When the brake pedal 1 is depressed and released, the piston 30b reciprocates in the cylinder 30a, allowing hydraulic fluid to flow between the actuator 3 and a reservoir tank 31.

Figure 6A:
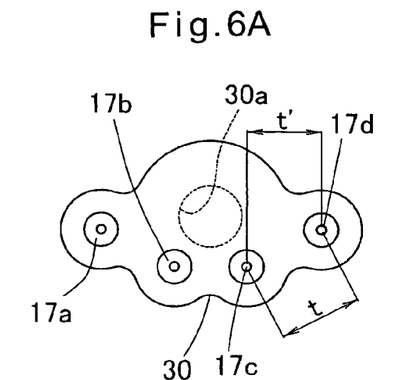
FIG. 6A is a front view of the housing of the actuator of the first embodiment.

As shown in FIG. 6A, the four wheel cylinder ports 17 of this embodiment are arranged in the width direction of the vehicle at equal intervals t with the ports 17a and 17d at both ends located above the other two ports 17b and 17c. In order to mount or dismount the pipes r to or from the respective ports 17, it is necessary to insert a spanner 50 having a long handle into the engine room from above, engage a joint member for coupling each pipe r to one of the ports 17 with its tip, and tighten or loosen it. In order to tighten or loosen the joint member, the spanner has to be turned at least 90 degrees as shown in FIG. 5. As will be readily understood from this figure, if the ports 17a and 17d were provided at the same level as the other ports 17b and 17c, the handle of the spanner 50 would interfere with either the relay box 8a or the engine 6 if trials are made to turn the spanner by 90 degrees with its tip kept in engagement with the joint member for one of the ports 17a and 17d. In the arrangement of this embodiment, since the ports 17a and 17d are located above the ports 17b and 17c, the joint members for the ports 17a and 17d can be easily tightened and loosened by turning the spanner 50 by at least 90 degrees without the possibility of its handle interfering with the engine 6 or the relay box 8a. Since at least the ports 17 at both ends are located at a higher level than conventional ports, they are easily accessible from above the engine room even if the hood is high.

Figure 6B:
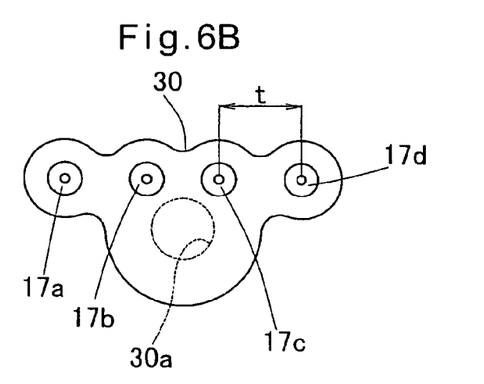
FIGS. 6B, 6C and 6D are front views of the housings of the actuators of the second to fourth embodiments.

In the embodiment of FIG. 6B, four wheel cylinder ports 17a–17d are arranged substantially horizontally. In other words, in this embodiment, all four ports 17a–17d are provided at a high level, i.e. above the cylinder 30a (as shown), or at a low level, i.e. below the cylinder 30a (not shown). Compared to this embodiment, the distance between the ports 17a and 17d in the embodiment of FIG. 6A is short. This is because in this embodiment, the horizontal distances t' between the ports 17a and 17b and between the ports 17c and 17d are shorter than their actual distances t (see FIG. 6A). This makes it possible to further reduce the size of the actuator.

Figure 6C:
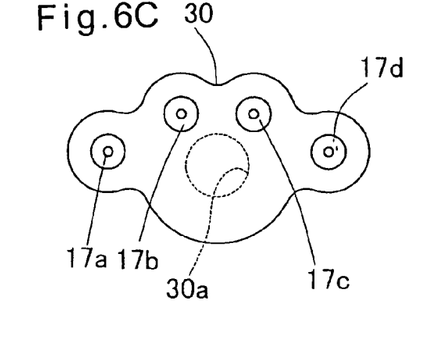
Figure 6D:
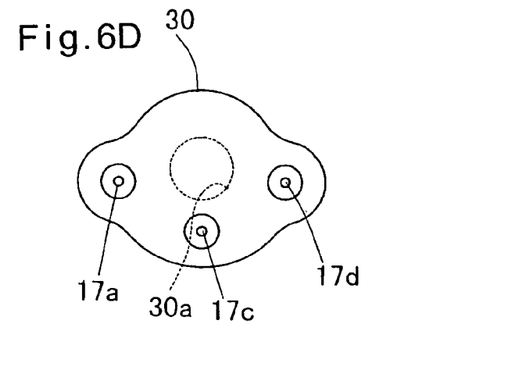

In the embodiment of FIG. 6C, the intermediate ports 17b and 17c are located above the ports 17b and 17c of the embodiment of FIG. 6A with the positions of the ports 17a and 17b at both ends unchanged. One of the embodiments of FIGS. 6A–6C should be selected depending on how the pipes r are arranged. Also, the number of wheel cylinder ports 17 is not limited to four. For example, according to the type of hydraulic brake system, the actuator may have three wheel cylinder ports 17 as shown in FIG. 6D. Ordinarily, the distances t between the adjacent ports 17 have to be at least 20–30 mm.

In the embodiment of FIGS. 1–5, an electronic control unit 11 is provided on one side of the housing 10, a pressure accumulator 36 is mounted on the other side of the housing, and a pressure accumulating pump 37 and its motor 38 are provided under the housing 10. Numeral 39a indicates a high-pressure fluid pipe. Numeral 39b is a rubber hose.

In the embodiment of FIGS. 1–5, the housing 10 of the actuator 3 also serves as the body 30 of the master cylinder 2. But the housing 10 and the body 30 may be two separate members. The ports 17a–17d are arranged in a single plane in the embodiments. But they may be formed in different planes.

Figure 7A:
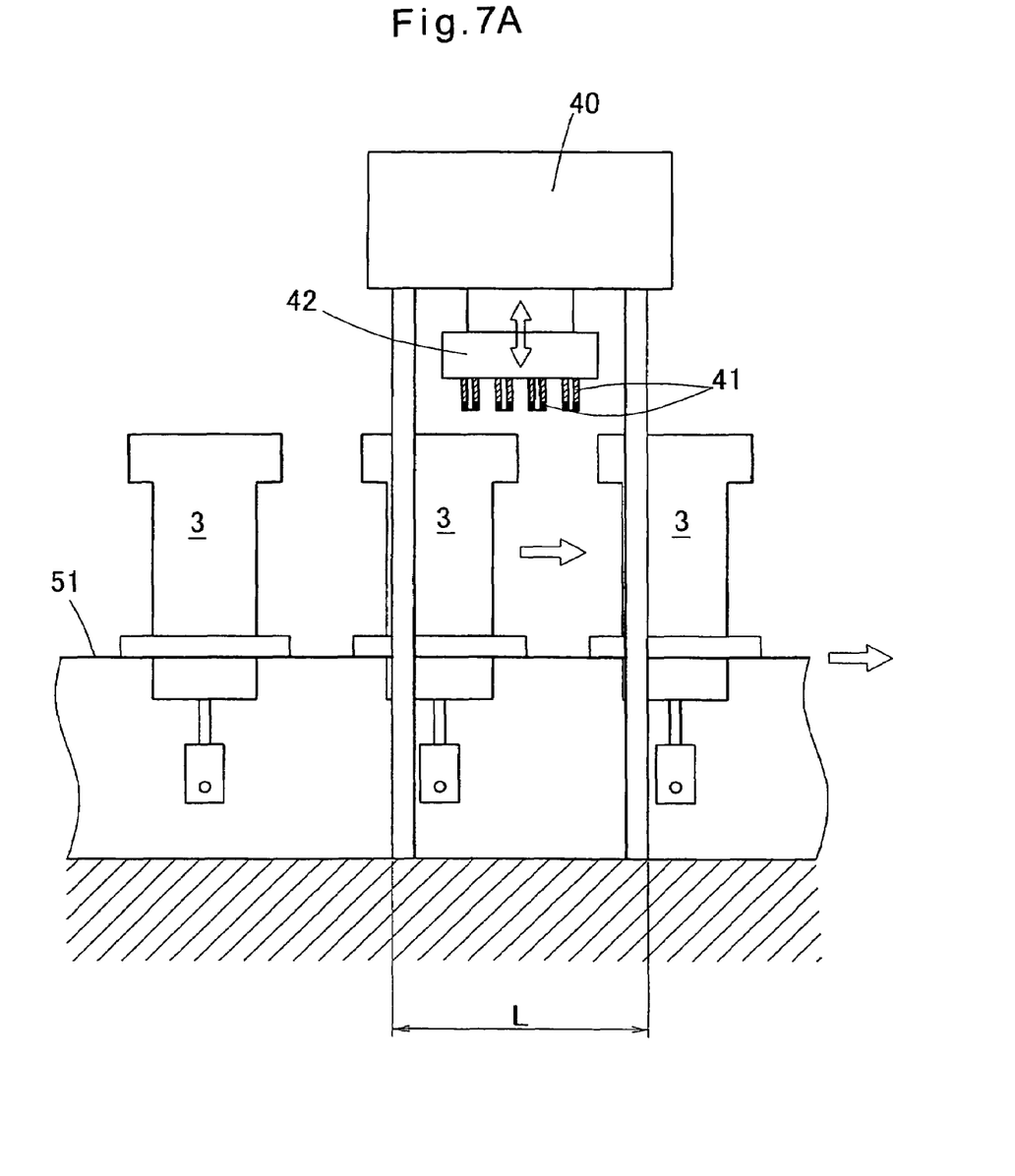
FIG. 7A is a partial front view of an inspection device according to the invention for inspecting actuators according to the present invention for their hydraulic performance.
Figure 7B:
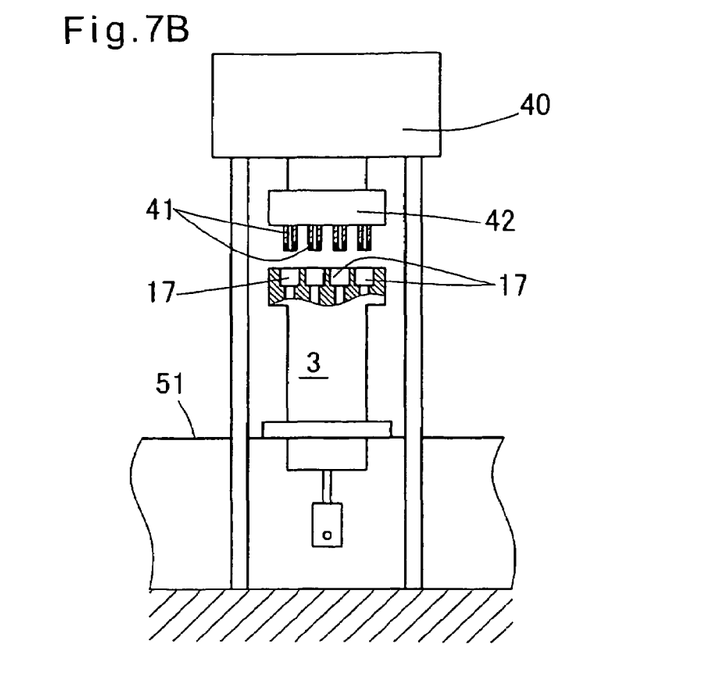
FIGS. 7B and 7C are front views of the inspection device of FIG. 7A, showing its different operational states.
Figure 7C:
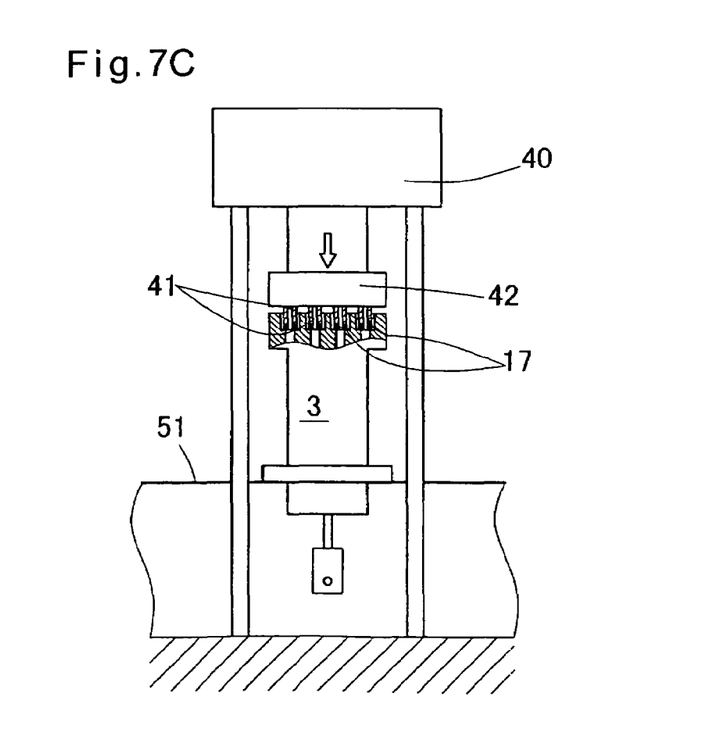

FIGS. 7A–7C show how a plurality of actuators 3 according to this invention are inspected one by one for their hydraulic performance in an inspection device 40 having a single coupler support member 42 (which corresponds to the jigs 42 of the conventional inspection device shown in FIG. 12) carrying port couplers 41 that can be coupled to the respective ports 17 formed in each actuator at one time. The actuators 3 are introduced one by one into the inspection device 40, in which the coupler support member 42 is moved toward the actuator 3 until the port couplers 41 are coupled to the respective ports 17 all at once, and then hydraulic fluid is supplied through the port couplers 41 and the ports 17 all at once to conduct the hydraulic performance inspection.

The inspection device 40 according to the invention needs only one coupler support member 42 that is reciprocative in one direction only. Thus, compared to the conventional inspection device shown in FIG. 12, it is possible to reduce its dimension L in the feed direction of actuators. Also, compared to the inspection device of FIG. 12, which needs two jigs 42 that are arranged so as to reciprocate in directions perpendicular to each other, the inspection device according to the invention, which needs only one such jig or coupler support member that reciprocates in one direction only, is much simpler in structure and thus much less expensive. Since all the ports 17 are provided in the front end face of the housing of the actuator, there is no need to connect any port or ports to pipes using union connectors 20. Thus, the port couplers 41 can be automatically connected to the respective ports 17, so that the inspection can be conducted efficiently.

What is claimed is:

1. An actuator for controlling brake hydraulic pressure, said actuator being adapted to be mounted on a vehicle between a brake pedal and brake wheel cylinders for front wheels and rear wheels of the vehicle, the front wheels being spaced from each other in a width direction of the vehicle, and comprising:

a housing, and pressure increase and pressure reduction control valves mounted in said housing to control hydraulic pressures to be supplied to the respective brake wheel cylinders, said housing having four wheel cylinder ports which are all formed in one side of said housing and which are adapted to be connected to the brake wheel cylinders, said actuator being adapted to be mounted on the vehicle with said one side of said housing facing forward of the vehicle and each of said four wheel cylinder ports spaced from the other three of said four wheel cylinder ports in the width direction of the vehicle, wherein said four cylinder ports are arranged in the width direction of the vehicle with two of said four ports at both ends located at a higher level than the other two of said four ports and no ports other than said four wheel cylinder ports are formed in said one side of said housing.

2. The actuator of claim 1, wherein the distance between each adjacent pair of said four wheel cylinder ports is equal to the distance between any other adjacent pair of said four wheel cylinder ports.

3. The actuator of claim 1 wherein said housing serves as a body of a master cylinder.

4. The actuator of claim 3 wherein the master cylinder includes a piston rod to which a brake pedal is coupled.

5. The actuator of claim 1 wherein an electronic control unit is mounted on one side of said housing.

6. The actuator of claim 5 wherein a pressure accumulator is mounted on another side of said housing.

7. The actuator of claim 6 wherein a pressure accumulating pump and a motor for the pressure accumulating pump are mounted on a bottom surface of said housing.

* * * * *